(12) United States Patent
Barsness et al.

(10) Patent No.: US 8,037,184 B2
(45) Date of Patent: Oct. 11, 2011

(54) QUERY GOVERNOR WITH NETWORK MONITORING IN A PARALLEL COMPUTER SYSTEM

(75) Inventors: Eric Lawrence Barsness, Pine Island, MN (US); David L. Darrington, Rochester, MN (US); Amanda Peters, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 786 days.

(21) Appl. No.: 11/671,546

(22) Filed: Feb. 6, 2007

(65) Prior Publication Data
US 2008/0189288 A1    Aug. 7, 2008

(51) Int. Cl.
*G06F 13/00* (2006.01)

(52) U.S. Cl. ........................................................ 709/226

(58) Field of Classification Search ........... 709/223–226
See application file for complete search history.

(56) References Cited

U.S. PATENT DOCUMENTS

| | | | |
|---|---|---|---|
| 2004/0172385 A1* | 9/2004 | Dayal | 707/3 |
| 2005/0059397 A1* | 3/2005 | Zhao | 455/435.2 |
| 2007/0286071 A1* | 12/2007 | Cormode et al. | 370/229 |
| 2008/0052784 A1* | 2/2008 | Wiley et al. | 726/28 |

* cited by examiner

*Primary Examiner* — Robert B Harrell
(74) *Attorney, Agent, or Firm* — Martin & Associates, LLC; Bret J. Petersen

(57) ABSTRACT

An apparatus and method for a query governor to govern query execution in a parallel computer system with one or more networks. The query governor uses a network monitor to gather network status information to determine how to govern query execution. The query governor may also use historical information of previous query execution stored in a query file to determine if the query should be allowed to execute. The query governor may also use node and network restrictions to determine what networks the query can use.

17 Claims, 5 Drawing Sheets

Query File - Historical Information

| Query ID | Network Used | Elapsed Time | Node List | Priority |
|---|---|---|---|---|
| | | | | |
| | | | | |

Network File

| Network ID | Time-stamp | Byte Count | Latency | Re-transmits | # of Connections | Packets Dropped | Resets |
|---|---|---|---|---|---|---|---|
| | | | | | | | |
| | | | | | | | |

Node/Network Restrictions

| ID | Priority | Restricted IDs | Byte Count | Latency | Other network characteristics |
|----|----------|----------------|------------|---------|-------------------------------|
|    |          |                |            |         |                               |
|    |          |                |            |         |                               |

QUERY GOVERNOR WITH NETWORK MONITORING IN A PARALLEL COMPUTER SYSTEM

BACKGROUND OF THE INVENTION

1. Technical Field

This invention generally relates to query governors in a computer database system, and more specifically relates to a database query governor for a parallel computer database system.

2. Background Art

Databases are computerized information storage and retrieval systems. A database system is structured to accept commands to store, retrieve and delete data using, for example, high-level query languages such as the Structured Query Language (SQL). The term "query" denominates a set of commands for retrieving data from a stored database. The query language requires the return of a particular data set in response to a particular query.

Optimization and execution of a database query can be a resource-intensive and time-consuming process. Further, the larger the database, the longer the time needed to execute the query. In order to prevent an excessive drain on resources, many databases are configured with query governors. A query governor prevents the execution of large and resource-intensive queries by referencing a defined threshold. If the cost of executing a query exceeds the threshold, the query is not executed. The query governor has a configuration file that determines the databases that an instance of the governor monitors and how it manages it.

Many large institutional computer users are experiencing tremendous growth of their databases. One of the primary means of dealing with large databases is that of distributing the data across multiple partitions in a parallel computer system. The partitions can be logical or physical over which the data is distributed. Prior art query governors have limited features when used in parallel computer systems. The query governors do not consider network resources of multiple networks in a parallel system with a large number of interconnected nodes.

Massively parallel computer systems are one type of parallel computer system that have a large number of interconnected compute nodes. A family of such massively parallel computers is being developed by International Business Machines Corporation (IBM) under the name Blue Gene. The Blue Gene/L system is a scalable system in which the current maximum number of compute nodes is 65,536. The Blue Gene/L node consists of a single ASIC (application specific integrated circuit) with 2 CPUs and memory. The full computer is housed in 64 racks or cabinets with 32 node boards in each rack.

The Blue Gene/L supercomputer communicates over several communication networks. The 65,536 computational nodes are arranged into both a logical tree network and a 3-dimensional torus network. The logical tree network connects the computational nodes in a tree structure so that each node communicates with a parent and one or two children. The torus network logically connects the compute nodes in a three-dimensional lattice like structure that allows each compute node to communicate with its closest 6 neighbors in a section of the computer.

On parallel computer systems in the prior art, the query governor is not able to effectively control the total use of resources across multiple nodes with one or more networks. Without a way to more effectively govern queries, computer systems administrators will continue to have inadequate control over database queries and their use of system resources.

DISCLOSURE OF INVENTION

According to the preferred embodiments, an apparatus and method is described for a query governor to govern query execution in a parallel computer system with one or more networks. The query governor uses a network monitor to gather network information to determine how to govern query execution. The query governor may also use historical information of previous query execution stored in a query file to determine if the query should be allowed to execute. The query governor may also use node and network restrictions to determine what networks the query can use.

The disclosed embodiments are directed to a massively parallel computer system with multiple networks but could be implemented on any computer system with one or more networks and a number of parallel nodes.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and.

BEST MODE FOR CARRYING OUT THE INVENTION

1.0 Overview

Figure 1:
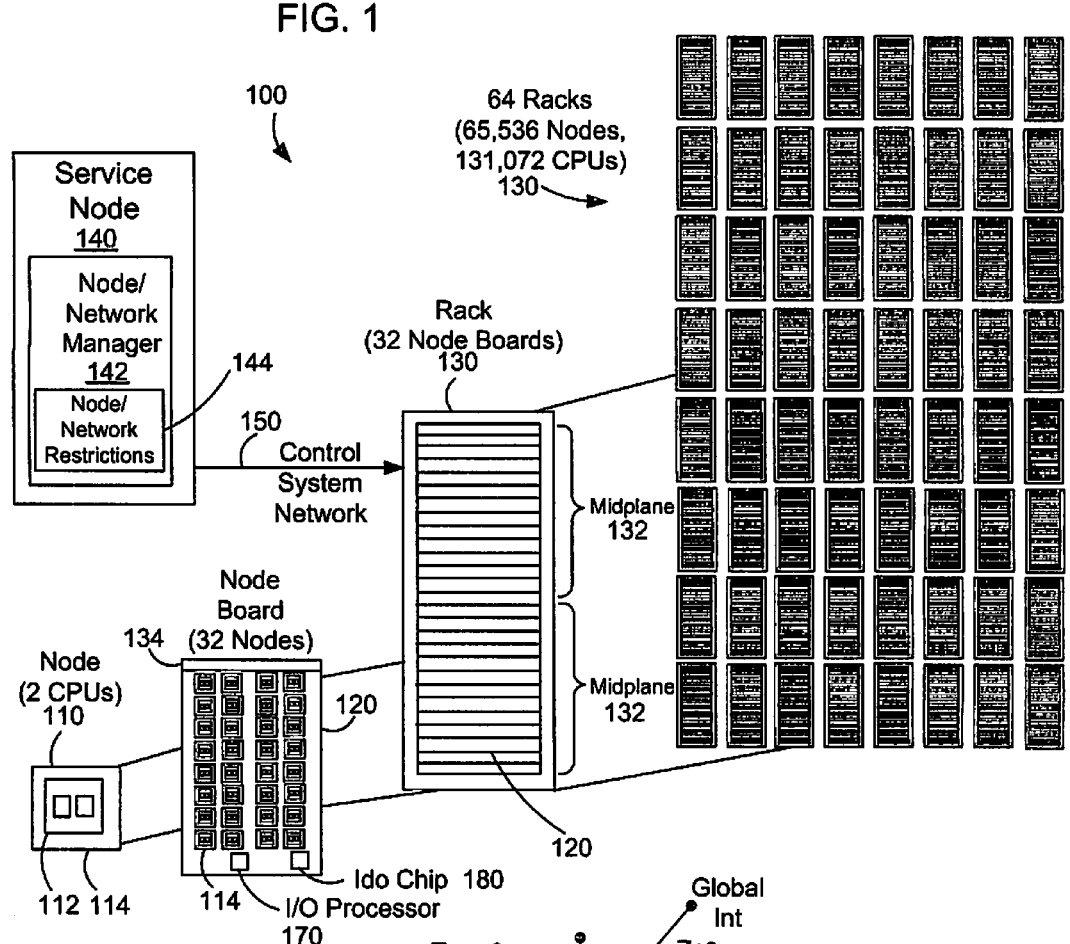
FIG. 1 is a block diagram of a computer system according to preferred embodiments.

The present invention relates to query governors that govern the access of database queries to partitioned database tables. For those not familiar with databases, queries, partitioned database tables or query governors, this Overview section will provide background information that will help to understand the present invention.

Known Databases and Database Queries

There are many different types of databases known in the art. The most common is known as a relational database (RDB), which organizes data in tables that have rows that represent individual entries or records in the database, and columns that define what is stored in each entry or record.

To be useful, the data stored in databases must be able to be efficiently retrieved. The most common way to retrieve data from a database is to generate a database query. A database query is an expression that is evaluated by a database manager. The expression may contain one or more predicate expressions that are used to retrieve data from a database. For example, lets assume there is a database for a company that includes a table of employees, with columns in the table that represent the employee's name, address, phone number, gender, and salary. With data stored in this format, a query could be formulated that would retrieve the records for all female employees that have a salary greater than $40,000. Similarly, a query could be formulated that would retrieve the records for all employees that have a particular area code or telephone prefix. One popular way to define a query uses Structured Query Language (SQL). SQL defines a syntax for generating and processing queries that is independent of the actual structure and format of the database. When the database receives a query request, it produces a mini access plan to execute the query in the database. The mini-plan may be stored in a mini-plan cache for use with subsequent queries that use the same mini-plan. In the prior art, a tool known as a query optimizer evaluates expressions in a query and optimizes the query and generates the access plan to access the database.

Known Partitioned Database Tables

A partitioned database table is divided into multiple discrete portions referred to as partitions. Each entry in the table is allocated to a respective one of the partitions. A partition is usually a discrete data entry, such as a file, but contains the same definitional structure as all other partitions of the same table. Partitioning may be performed for a variety of reasons, and is usually performed on very large tables as a way to break the data into subsets of some conveniently workable size. By dividing a table into partitions, improved execution efficiency can result by working with a smaller subset of the table instead of the whole table.

Known Query Governors for Partitioned Database Tables

As introduced above, partitioned databases are sometimes configured with query governors to prevent an excessive drain on resources. A query governor prevents the execution of large and resource intensive queries by referencing a defined threshold. If the cost of executing a query exceeds the threshold, the query is not executed. The query governor is sometimes implemented as part of the query optimizer as described below with reference to preferred embodiments herein. The query governor has a configuration file that determines the databases that an instance of the governor monitors and how the governor manages the database.

2.0 Detailed Description

A query governor is provided that uses a network monitor to determine the network status before executing a query. The network monitor has a variety of network status information that reflects the load on the network. The query governor may also consider the query's resource needs based on historical query data to determine if the query should execute on the network. The query governor may also use node and network restrictions to determine what networks the query can use. The query governor may also use the network related criteria as described herein in combination with traditional query governor metrics to determine when to govern a query. The preferred embodiments will be described with respect to the Blue Gene/L massively parallel computer being developed by International Business Machines Corporation (IBM). However, those skilled in the art will appreciate that the mechanisms and apparatus of the present invention apply equally to any partitioned computer system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

FIG. 1 shows a block diagram that represents a massively parallel computer system 100 that incorporates many of the features in the Blue Gene/L computer system. The Blue Gene/L system is a scalable system in which the maximum number of compute nodes is 65,536. Each node 110 has an application specific integrated circuit (ASIC) 112, also called a Blue Gene/L compute chip 112. The compute chip incorporates two processors or central processor units (CPUs) and is mounted on a node daughter card 114. The node also typically has 512 megabytes of local memory (not shown). A node board 120 accommodates 32 node daughter cards 114 each having a node 110. Thus, each node board has 32 nodes, with 2 processors for each node, and the associated memory for each processor. A rack 130 is a housing that contains 32 node boards 120. Each of the node boards 120 connect into a midplane printed circuit board 132 with a midplane connector 134. The midplane 132 is inside the rack and not shown in FIG. 1. The full Blue Gene/L computer system would be housed in 64 racks 130 or cabinets with 32 node boards 120 in each. The full system would then have 65,536 nodes and 131,072 CPUs (64 racks×32 node boards×32 nodes×2 CPUs).

The Blue Gene/L computer system structure can be described as a compute node core with an I/O node surface, where communication to 1024 compute nodes 110 is handled by each I/O node that has an I/O processor 170 connected to the service node 140. The I/O nodes have no local storage. The I/O nodes are connected to the compute nodes through the logical tree network and also have functional wide area network capabilities through a gigabit ethernet network (not shown). The gigabit Ethernet network is connected to an I/O processor (or Blue Gene/L link chip) 170 located on a node board 120 that handles communication from the service node 140 to a number of nodes. The Blue Gene/L system has one or more I/O processors 170 on an I/O board (not shown) connected to the node board 120. The I/O processors can be configured to communicate with 8, 32 or 64 nodes. The service node uses the gigabit network to control connectivity by communicating to link cards on the compute nodes. The connections to the I/O nodes are similar to the connections to the compute node except the I/O nodes are not connected to the torus network.

Again referring to FIG. 1, the computer system 100 includes a service node 140 that handles the loading of the nodes with software and controls the operation of the whole system. The service node 140 is typically a mini computer system such as an IBM pSeries server running Linux with a control console (not shown). The service node 140 is connected to the racks 130 of compute nodes 110 with a control system network 150. The control system network provides control, test, and bring-up infrastructure for the Blue Gene/L system. The control system network 150 includes various network interfaces that provide the necessary communication for the massively parallel computer system. The network interfaces are described further below.

The service node 140 manages the control system network 150 dedicated to system management. The control system network 150 includes a private 100-Mb/s Ethernet connected to an Ido chip 180 located on a node board 120 that handles communication from the service node 160 to a number of nodes. This network is sometime referred to as the JTAG network since it communicates using the JTAG protocol. All control, test, and bring-up of the compute nodes 110 on the node board 120 is governed through the JTAG port communicating with the service node. In addition, the service node 140 includes a node/network manager 142. The node/network manager 142 comprises software in the service node 140 that operates to allow the administrator to setup node and network restrictions 144 for individual nodes and/or individual networks.

Figure 2:
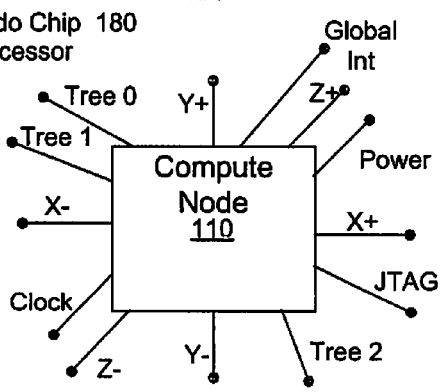
FIG. 2 is a block diagram of a compute node to illustrate the network connections to the compute node.

The Blue Gene/L supercomputer communicates over several communication networks. FIG. 2 shows a block diagram that shows the I/O connections of a compute node on the Blue Gene/L computer system. The 65,536 computational nodes and 1024 I/O processors 170 are arranged into both a logical tree network and a logical 3-dimensional torus network. The torus network logically connects the compute nodes in a lattice like structure that allows each compute node 110 to communicate with its closest 6 neighbors. In FIG. 2, the torus network is illustrated by the X+, X−, Y+, Y−, Z+ and Z− network connections that connect the node to six respective adjacent nodes. The tree network is represented in FIG. 2 by the tree0, tree1 and tree2 connections. Other communication networks connected to the node include a JTAG network and a the global interrupt network. The JTAG network provides communication for testing and control from the service node 140 over the control system network 150 shown in FIG. 1. The global interrupt network is used to implement software barriers for synchronization of similar processes on the compute nodes to move to a different phase of processing upon completion of some task. Further, there are clock and power signals to each compute node 110.

Figures 3, 4, 5:
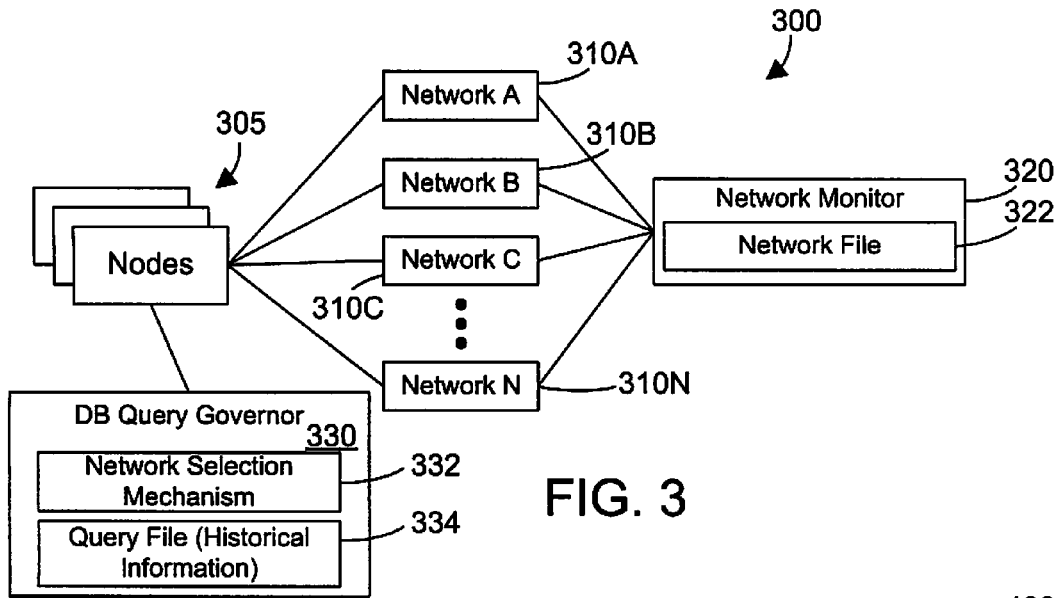
FIG. 3 is a block diagram representing a query governor system according to preferred embodiments.
FIG. 4 is a block diagram of a query file that contains historical information about query executions according to a preferred embodiment.
FIG. 5 is a block diagram of a network file that contains information about network utilization according to a preferred embodiment.

Referring to FIG. 3, a system 300 is shown to include multiple nodes 305 coupled together via multiple networks, shown in FIG. 1 as 310A, 310B, 310C, . . . , 310N. The system 300 represents a portion of the computer system 100 shown in FIG. 1. The multiple networks are also coupled to a network monitor 320 that monitors the networks and logs the network characteristics in a network file 322. A database query governor 330 includes a network selection mechanism 332 to determine which network on which to run the optimized query when the query is executed. The network selection mechanism 332 of the query governor selects a network for a query based on the network characteristics that are stored in the network file 322, the node/network restrictions 144 (FIG. 1) and a query file 334. The query file 334 holds historical information about executed queries. Using these files, the query governor 330 governs executions of queries based on network loading and restrictions. In the preferred implementation, the multiple networks are independent networks so a problem with one network does not affect the function of a different network. However, networks that are not independent may also be used.

FIGS. 4 and 5 illustrate two files that store information that can be used to determine how to govern queries to the database. FIG. 4 illustrates a query file 400 that is used by a database query governor to govern query use of network resources. The query file 400 contains records 410A through 410N that have historical information about queries that have executed on the computer system. The records 410A through 410N in the query file 400 contain information such as the query name or ID, the network used, the elapsed time used for the query to execute on the node, the node list for the query, and the query priority. The network used is the name or ID of the network that the query uses to access the database structure needed for the query. The node list is a list of nodes that contain the database structure or are otherwise needed to execute the query. The query priority is an optional attribute specified by a user that indicates the importance of the query. A higher priority query can be given access to a network even where the network is overloaded or restricted, while a lower priority query will not be allowed to execute with the same level of network activity.

FIG. 5 illustrates a network file 500 that is used by the query governor. The network file is maintained by the network monitor 320 (FIG. 3). The network file 500 contains records 510A through 510N that have status information about the networks in the computer system. The records 510A through 510N in the network file 500 contain information such as the network ID, a time stamp, current utilization, future utilization and network availability. The current utilization represents how busy the network is in terms of bandwidth utilization at the time of the timestamp. Where possible, the future utilization of the network is predicted and stored. Similar to the node availability described above, the availability of the network indicates whether the network is available or not. Data stored in the network file 500 includes historical and real time information about the network status and loading.

Figures 6, 8:
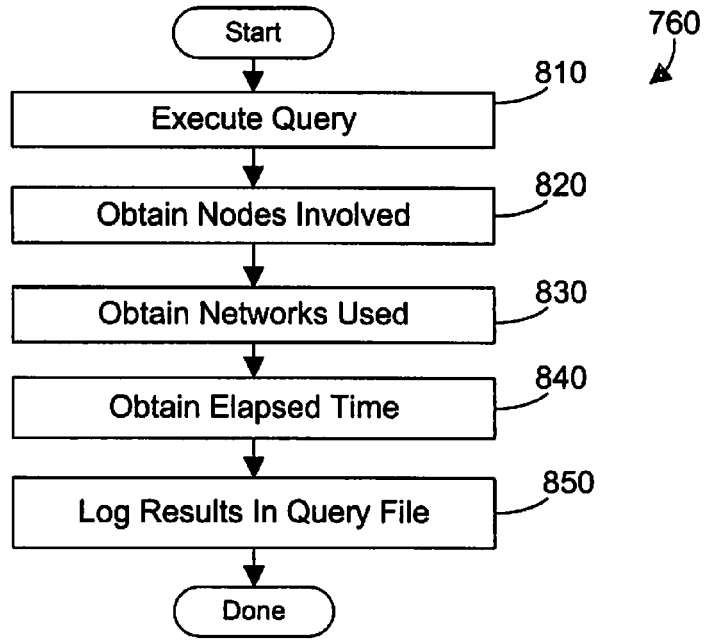
FIG. 6 is a block diagram of node/network restrictions that contains restriction information about nodes and networks according to a preferred embodiment.
FIG. 8 is a method flow diagram that shows one suitable implementation of step 760 shown in FIG. 7.

FIG. 6 illustrates a block diagram of node/network restrictions 600 that are used by the query governor. Node/network restrictions 600 in FIG. 6 represent one specific implementation for the node/network restrictions 144 shown in FIG. 1. The node/network restrictions 600 contains records 610A through 610N that have information about restricted nodes and networks in the computer system. The node/network restrictions are setup by a system administrator using the node/network manager 142 (FIG. 1) in the service node 140 (FIG. 1). The node/network manager 142 (FIG. 1) may include a graphical user interface (GUI) to allow a system administrator to setup node and network restrictions. The node and network restrictions may include parameters of when to restrict access to individual networks and nodes that are associated with individual networks. The query monitor checks the node/network restrictions to govern database queries and to determine whether a query can execute on a given network. The records 610A through 610N in the node/network restrictions 600 contain information such as the network or node ID, the priority, and restricted IDs. Further, the node/network restrictions can include restrictions derived from any of the node and network characteristics shown in FIG. 5, or combination of those characteristics. For example, a network restriction could be set for a byte count greater than an amount indicated in the record or for a specific latency on the network. The priority field in the records 610A through 610N indicates that queries with a given priority are allowed to execute on the network but queries with a lower priority are not to be allowed to execute on the network by the query governor. The restricted IDs are identification information for nodes, applications or processes that are to be restricted from access to listed network.

Figure 7:
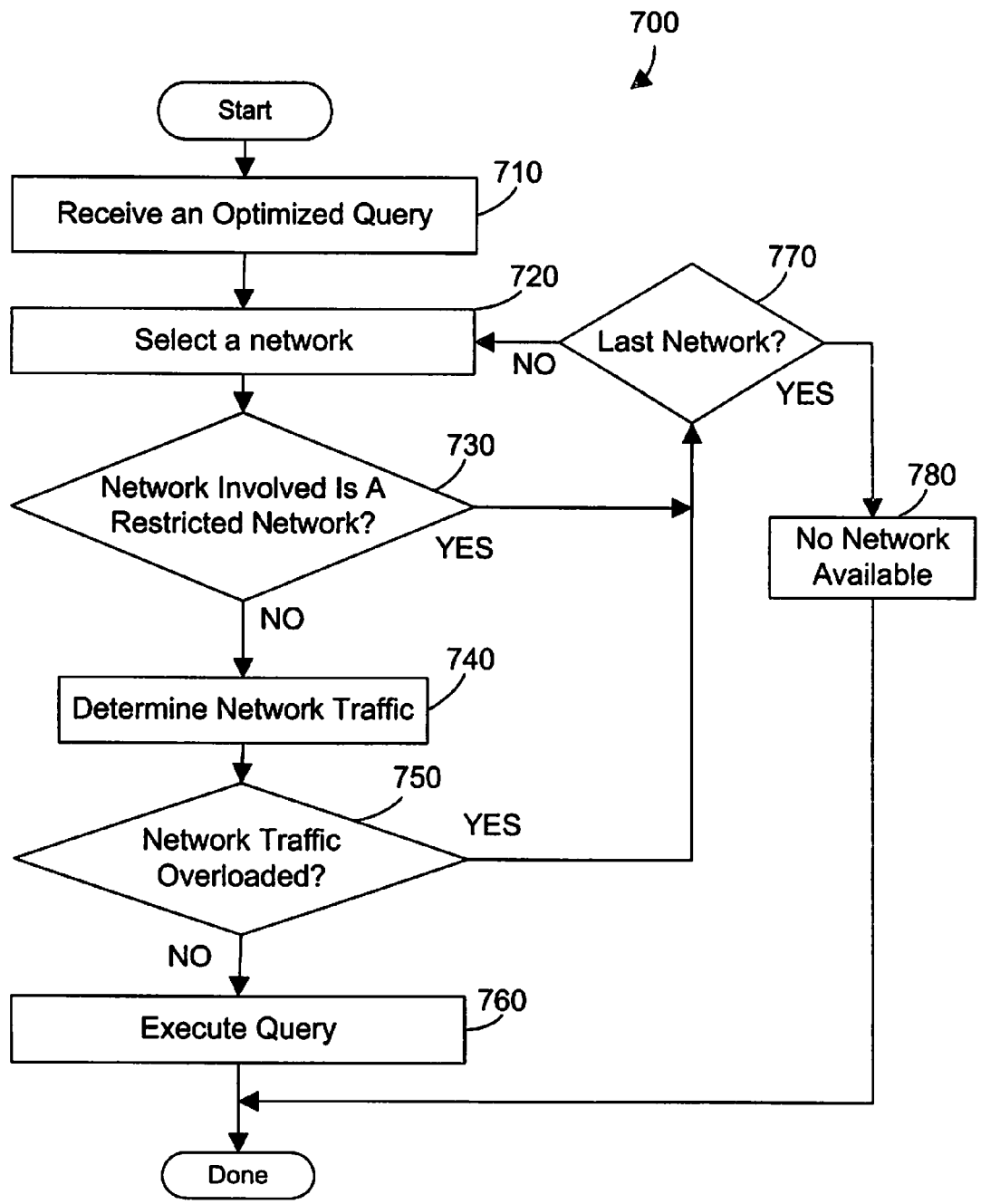
FIG. 7 is a method flow diagram for a query governor in a database system according to a preferred embodiment.

FIG. 7 shows a method 700 for governing a computer database. The method 700 first receives an optimized query (step 710) from a query optimizer according to the prior art. Next, select a network that can be used for executing the query (step 720). The selected network is checked to see if it is restricted by checking the node/network restrictions (144 in FIG. 1 described above) for the selected network (step 730). If the selected network is not a restricted network (step 730=no) then determine the network traffic on the network (step 740). If the network traffic is such that the network is not overloaded (step 750=no) then execute the query (step 760—see FIG. 8) and the method is then done. If the network involved is a restricted network (step 730=yes) or if the network is overloaded (step 750=yes) then check if the network is the last network (step 770). If the network is not the last network (step 770=no) then go to step 720 and select another network. If the network is the last network (step 770=yes) then the governor determines that no network is currently available to execute the query (step 780) and the method is done.

FIG. 8 shows a method 760 as one possible implementation for step 760 in FIG. 7. Method 760 illustrates a method for executing a query and obtaining execution information to assist in governing queries in a computer database. First, execute the query (step 810) and collect the information and store it in the query file in the following steps. Obtain the nodes involved to execute the query (step 820). Next, obtain the networks used to execute the query (step 830), then obtain the elapsed time to execute the query (step 840). Then log the results of each of these steps in the query file (step 850) and the method is then done.

Figure 9:
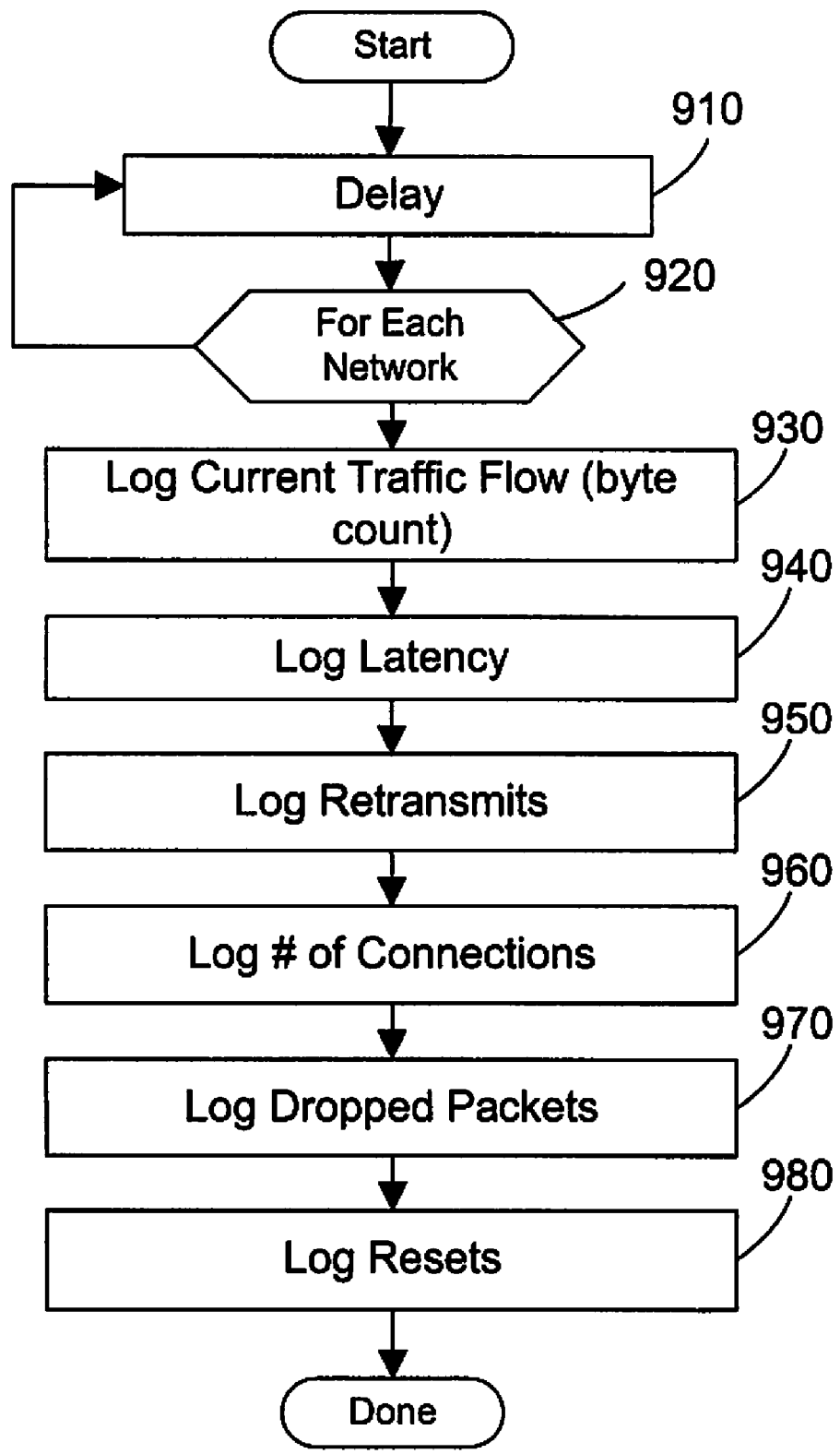
FIG. 9 is another method flow diagram for monitoring network activity in a query governor system according to a preferred embodiment.

FIG. 9 shows a method 900 that monitors network traffic. The method may be executed on the compute nodes or on the service node 140 shown in FIG. 1. This method is executed for each network to govern database query activity in the database. First, delay for a period of time each time through the monitoring to reduce the loading of system resources for monitoring (step 910). Next, for each network (step 920) log the current traffic flow on the network such as the byte count (step 930). Also log the latency of the network (step 940), the number of retransmits (step 950), the number of logical connections on the network (step 960), the number of dropped packets (step 970), and the number of resets of the network connection (step 980) and the method is then done. Logging of these items means to update the network file with the data determined in each of the above steps.

As described above, embodiments provide a method and apparatus for a query governor to monitor networks to govern the execution of queries in a parallel computer system. In preferred embodiments a query governor monitors a network for availability and loading to govern query access to system resources, thereby giving computer systems administrators more control over database queries and their use of system resources.

One skilled in the art will appreciate that many variations are possible within the scope of the present invention. For example, the query governor may also use the network related criteria as described herein in combination with traditional query governor metrics to determine when to govern a query. For Example, traditional governor metrics include the amount of temporary storage for the query, the estimated time to execute, whether there are too many record locks, and the result set size returned by the query. Thus, while the invention has been particularly shown and described with reference to preferred embodiments thereof, it will be understood by those skilled in the art that these and other changes in form and details may be made therein without departing from the spirit and scope of the invention.

What is claimed is:

1. A computer apparatus comprising:
a plurality of compute nodes each having a memory and at least one processor;
a database residing in the memory;
a plurality of networks connecting the plurality of nodes;
a network monitor that monitors the plurality of networks and stores network data in a network file;
a query file with historical information regarding executed queries which includes information selected from the following: network used, elapsed time, node list, and priority; and
a query governor that selects a network from the plurality of networks for the query to access the database from the plurality of networks based on the network data in the network file and the historical information regarding executed queries in the query file.

2. The computer apparatus of claim 1 further comprising node and network restrictions that are setup by a system administrator and used by the query governor to restrict access to a network by the query.

3. The computer apparatus of claim 2 wherein the node and network restrictions are selected from the following: node ID, network ID, byte count, priority and latency.

4. The computer apparatus of claim 1 wherein the network file includes information selected from the following: byte count, latency, retransmits, packets dropped, and resets.

5. The computer apparatus of claim 1 further comprising a service node connected to the plurality of nodes that controls the plurality of nodes and wherein the network monitor resides in and executes from a memory of the service node.

6. The computer apparatus of claim 1 wherein the query governor uses a query governor metric in combination with the network data from the network file to govern whether the query can access the database.

7. A computer program product for executing on a parallel computer system with a plurality of compute nodes comprising:
a network monitor that monitors a plurality of networks connecting the plurality of compute nodes to collect network data and stores the network data in a network file;
a query governor that maintains a query file with historical information regarding executed queries which includes information selected from the following: network used, elapsed time, node list, and priority;
wherein the query governor selects a network for the query to access the database from the plurality of networks based on the data in the network file and the historical information regarding executed queries in the query file; and computer-readable storage medium in which computer instructions are stored, which instructions, when read by a computer, cause the computer to perform the steps of the query governor.

8. The computer program product of claim 7 wherein the computer system includes a service node connected to the plurality of nodes that controls the plurality of nodes and wherein the network monitor resides in and executes from a memory of the service node.

9. The computer program product of claim 8 further comprising node and network restrictions that are setup by a system administrator and used by the query governor to restrict access to the selected network by the query.

10. The computer program product of claim 9 wherein the node and network restrictions are selected from the following: node ID, network ID, byte count, priority and latency.

11. The computer program product of claim 7 wherein the network data in the network file includes information selected from the following: byte count, latency, retransmits, packets dropped, and resets.

12. The computer program product of claim 7 wherein the query governor uses a query governor metric in combination with the network data from the network file to govern whether the query can access the database.

13. A computer implemented method for governing access to data on a partitioned database comprising the steps of:

receiving a query to the database;

monitoring a plurality of networks connected to a plurality of compute nodes each having a memory and at least one processor to gather network data;

storing the network data in a network file;

maintaining a query file with historical information regarding executed queries which includes information selected from the following: network used, elapsed time, node list, and priority; and selecting a network from the plurality of networks for the query to access the database based on network data in the network file and the historical information regarding executed queries in the query file.

14. The computer implemented method of claim 13 further comprising the step of setting up node and network restrictions by a system administrator and using the node and network restrictions to restrict access to a network by the query.

15. The computer implemented method of claim 14 wherein the node and network restrictions include restricted applications and a query priority.

16. The computer implemented method of claim 13 wherein the step of selecting a network includes selecting a network from the plurality of networks that is not restricted and is not overloaded and executing the query over the selected network.

17. The computer implemented method of claim 13 wherein the network data includes information selected from the following: byte count, latency, retransmits, packets dropped, and resets.

* * * * *